US010114828B2

(12) United States Patent
Lee et al.

(10) Patent No.: US 10,114,828 B2
(45) Date of Patent: Oct. 30, 2018

(54) LOCAL CONTENT SHARING THROUGH EDGE CACHING AND TIME-SHIFTED UPLOADS

(71) Applicant: International Business Machines Corporation, Armonk, NY (US)

(72) Inventors: Kang-Won Lee, Seoul (KR); Robert B. Nicholson, Hampshire (GB); Ramya Raghavendra, White Plains, NY (US); Paul Schmitt, Santa Barbara, CA (US); Dinesh C. Verma, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 620 days.

(21) Appl. No.: 14/537,932

(22) Filed: Nov. 11, 2014

(65) Prior Publication Data
US 2016/0132522 A1 May 12, 2016

(51) Int. Cl.
*G06F 17/30* (2006.01)
*H04L 29/08* (2006.01)

(52) U.S. Cl.
CPC .. *G06F 17/30132* (2013.01); *G06F 17/30203* (2013.01); *H04L 67/2842* (2013.01)

(58) Field of Classification Search
CPC ... G06F 21/6218; G06F 21/6209; G06F 17/30
(Continued)

(56) References Cited

U.S. PATENT DOCUMENTS 5,991,816 A * 11/1999 Percival ............. H04N 21/6373
375/240.08
8,140,647 B1  3/2012 Juillard
(Continued)

FOREIGN PATENT DOCUMENTS

JP   2002351828 A   12/2002
JP   2009151503 A   7/2009
(Continued)

OTHER PUBLICATIONS

International Searching Authority, "Notification of Transmittal of the International Search Report and the Written Opinion of the International Searching Authority, or the Declaration," Patent Cooperation Treaty, dated Dec. 1, 2016, 7 Pages, International Application No. PCT/IB2015/057959.

(Continued)

*Primary Examiner* — Jay A Morrison
*Assistant Examiner* — Ken Hoang
(74) *Attorney, Agent, or Firm* — Robert C. Bunker

(57) ABSTRACT

According to one exemplary embodiment, a method for time-shifted uploading of a data file through a backhaul network to a backend provider is provided. The method may include intercepting an upload request from an originating user located at a network edge. The method may include caching the data file associated with the upload request upstream of the backhaul network. This method may include uploading a placeholder file to the backend provider. The method may include receiving a file ID from the backend provider. The method may include mapping the received file ID to the cached data file. The method may include intercepting a request to access the data file by a requesting user. The method may include sending the requesting user the cached data file. The method may include uploading a copy of the data file to the backend provider based on a backhaul utilization policy.

14 Claims, 4 Drawing Sheets

(58) Field of Classification Search
USPC ....... 709/203, 201, 206, 204, 214, 219, 246,
709/213, 217, 220, 223, 224, 225, 226,
709/227, 228, 229, 233, 235, 248;
707/E17.005, E17.044, 999.201, E17.009,
707/E17.013, E17.014, E17.032, E17.046,
707/E17.055, E17.108, E17.111, E17.116,
707/609, 661, 707, 740, 741, 777, 781,
707/812, 827, 999.002, 999.01, 999.1,
707/999.103, 999.104, 999.203
See application file for complete search history.

(56) References Cited

U.S. PATENT DOCUMENTS

| | | | |
|---|---|---|---|
| 8,959,431 B2* | 2/2015 | Bunker | G06F 17/212 |
| | | | 715/246 |
| 2004/0019613 A1* | 1/2004 | Jones | G06F 17/30011 |
| 2005/0188207 A1 | 8/2005 | Fujimoto et al. | |
| 2012/0101966 A1 | 4/2012 | van Coppenolle et al. | |
| 2013/0339407 A1* | 12/2013 | Sharpe | G06F 17/30194 |
| | | | 707/827 |
| 2014/0046883 A1 | 2/2014 | van Coppenolle et al. | |
| 2015/0006587 A1* | 1/2015 | Segaran | G06F 17/30303 |
| | | | 707/798 |
| 2015/0199414 A1* | 7/2015 | Braginsky | G06F 17/30132 |
| | | | 707/613 |

FOREIGN PATENT DOCUMENTS

| | | |
|---|---|---|
| WO | 2013003713 A2 | 1/2013 |
| WO | 2016075566 A1 | 5/2016 |

OTHER PUBLICATIONS

Johnson et al., "VillageShare: Facilitating content generation and sharing in rural networks", DEV '12, Mar. 11-12, 2012 ACM, 10 pages.

Zhu et al., "Upload Cache in Edge Networks", 2012 26th IEEE International Conference on Advanced Information Networking and Applications, pp. 307-313.

Spi Dst et al., "Evaluating the Benefits of Cache=Affinity Scheduling in Shared-Memory Multiprocessors", IP.com No. IPCOM000150858D, Original Publication Date: Aug. 31, 1992.

Internet Society et al., "A Survey of In-Network Storage Systems (RFC6392)", IP.com No. IPCOM000213091D, Original Publication Date: Oct. 1, 2011.

* cited by examiner

LOCAL CONTENT SHARING THROUGH EDGE CACHING AND TIME-SHIFTED UPLOADS

STATEMENT REGARDING FEDERALLY SPONSORED RESEARCH OF DEVELOPMENT

This invention was made with Government support under W911NF-06-3-0001 awarded by the United States Army. The Government has certain rights to this invention.

BACKGROUND

The present invention relates generally to the field of computing, and more particularly to time-shifted data uploading.

User-generated content has become an increasingly popular way for people to share data over the internet. User-generated content may include content such as video or audio clips, pictures, and blog posts that users create to share over the internet. Some user-generated content may entail large amounts of data, such as a high-definition video clip. In order for user-generated content to become available to the world at large, a user may upload the user-generated content data to a service provider that may then provide access to other users requesting the user-generated content.

SUMMARY

According to one exemplary embodiment, a method for time-shifted uploading of a data file through a backhaul network to a backend provider is provided. The method may include intercepting an upload request associated with the data file from an originating user located at a network edge within a local network. The method may also include caching the data file associated with the upload request in the local network upstream of the backhaul network. This method may then include uploading a placeholder file to the backend provider based on the intercepted upload request. The method may further include receiving a file identifier (ID) from the backend provider based on the uploaded placeholder file. The method may include mapping the received file ID to the cached data file. The method may also include intercepting a request to access the data file by a requesting user within the local network. The method may then include sending the requesting user the cached data file within the local network based on the mapping and the intercepted access request. The method may further include uploading a copy of the data file to the backend provider through the backhaul network based on a backhaul utilization policy.

According to another exemplary embodiment, a computer system for time-shifted uploading of a data file through a backhaul network to a backend provider is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include intercepting an upload request associated with the data file from an originating user located at a network edge within a local network. The method may also include caching the data file associated with the upload request in the local network upstream of the backhaul network. This method may then include uploading a placeholder file to the backend provider based on the intercepted upload request. The method may further include receiving a file identifier (ID) from the backend provider based on the uploaded placeholder file. The method may include mapping the received file ID to the cached data file. The method may also include intercepting a request to access the data file by a requesting user within the local network. The method may then include sending the requesting user the cached data file within the local network based on the mapping and the intercepted access request. The method may further include uploading a copy of the data file to the backend provider through the backhaul network based on a backhaul utilization policy.

According to yet another exemplary embodiment, a computer program product for time-shifted uploading of a data file through a backhaul network to a backend provider is provided. The computer program product may include one or more computer-readable storage devices and program instructions stored on at least one of the one or more tangible storage devices, the program instructions executable by a processor. The computer program product may include intercepting an upload request associated with the data file from an originating user located at a network edge within a local network. The computer program product may also include caching the data file associated with the upload request in the local network upstream of the backhaul network. The computer program product may then include uploading a placeholder file to the backend provider based on the intercepted upload request. The computer program product may further include receiving a file identifier (ID) from the backend provider based on the uploaded placeholder file. The computer program product may include mapping the received file ID to the cached data file. The computer program product may also include intercepting a request to access the data file by a requesting user within the local network. The computer program product may then include sending the requesting user the cached data file within the local network based on the mapping and the intercepted access request. The computer program product may further include uploading a copy of the data file to the backend provider through the backhaul network based on a backhaul utilization policy.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
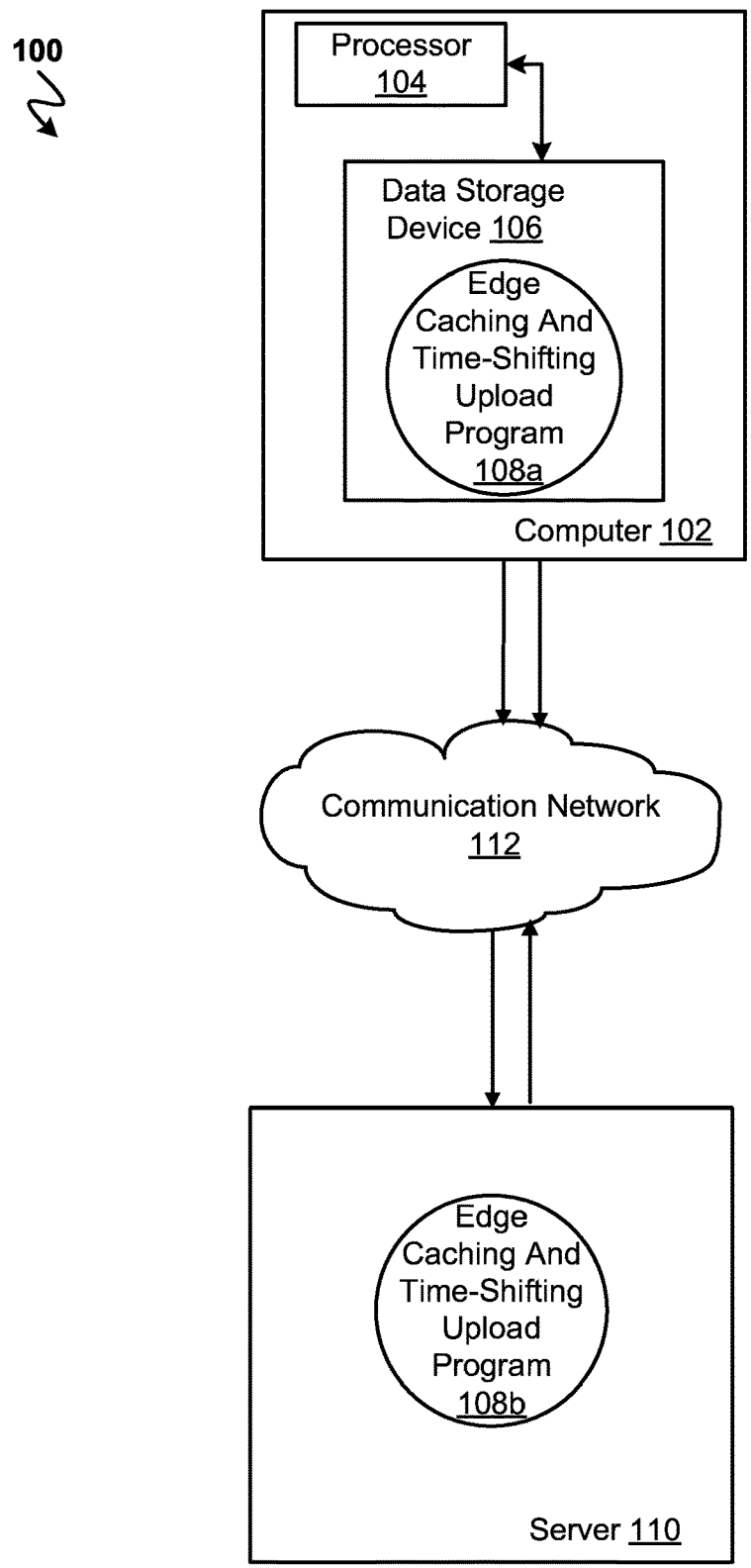
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for local content sharing through edge caching and time-shifting uploads.

As previously described, user-generated content may be uploaded by a user and shared over the internet through a network connection. Some user-generated content may include large amounts of data, such as a high-definition video file, that may need to be transmitted through a limited bandwidth network connection (e.g., backhaul network). For instance, users in rural or developing areas may have a bottlenecked backhaul network, such as a satellite link, that may not be able to upload user-generated content due to connection timeouts, or may fail to upload the user-generated content within a reasonable timeframe. However, local network connections at the network edge may be significantly faster with the bottleneck conditions occurring further downstream in the network. A significant portion of user requests for user-generated content may come from users at the network edge that may be local to the user that originally uploaded the user-generated content (i.e., the requesting user and originating user are both upstream of the bottleneck in the same local network). Additionally, bottlenecked network connections may not be used optimally at all times resulting in bandwidth that may not be fully saturated.

Therefore, it may be advantageous to, among other things, provide a way to transparently cache uploaded data to serve local requesting users and opportunistically upload data through a bottlenecked network connection at times when the network connection may not be used to capacity.

According to at least one embodiment, a user attempting to upload user-generated content to a backend service provider (e.g., YouTube™ (YouTube and all YouTube based trademarks and logos are trademarks or registered trademarks of Google Inc. and or/its affiliates), Facebook® (Facebook and all Facebook based trademarks and logos are trademarks or registered trademarks of Facebook Inc. and/or its affiliates), etc.) that shares user-generated content may be detected. The user-generated content data may then be cached locally (i.e., within the same local network as the uploading user) while a small placeholder file may be uploaded to the backend service provider as a temporary substitute. The file identifier (ID) for the uploaded placeholder file may be determined and then mapped to the locally cached file. User requests from within the local network to the service provider for the user-generated content may then be transparently redirected to the locally cached file instead of having the requesting user accessing the placeholder file. This redirection of local requests may occur before the user-generated content may be uploaded to the backend service provider and the user-generated content may be served locally (i.e., responses to user requests may entail sending the requesting user a copy of the user-generated content from the cached file) before the user-generated content may be uploaded. By transparently redirecting local users requesting the user-generated content to a locally cached copy of the user-generated content, the requesting user's experience may not be interrupted by requiring affirmative user participation. When bottlenecked upload bandwidth may not be used at full capacity, the full-sized file may be uploaded in a time-shifted manner by utilizing any free bandwidth. After uploading the full-sized file to the backend service provider, local user requests for the file may be redirected to the locally cached copy of the user-generated content to save bottlenecked bandwidth. Users that may not be in the local network (i.e., users without connectivity to the proxy cache of the user-generated content file) may reach the full-sized file at the backend service provider. Depending on the backend service provider's policies, the uploaded full-sized file may overwrite the placeholder file, or the full-sized file may be uploaded separately as a new upload if overwriting a previously uploaded file may not be permitted by the backend service provider.

According to at least one other embodiment, the edge caching and time-shifting upload process may operate cooperatively with the backend service provider. User-generated content may be intercepted and cached locally at the network edge. The backend service provider may identify requests from users that may be connected at the edge where the cached user-generated content is located. Local requesting users may then be redirected by the backend service provider to be served from the locally cached user-generated content. Users requesting the user-generated content outside the network edge, where the user-generated content may not be cached, may be sent a message from the backend service provider indicating that the user-generated content may be available after a certain amount of time when the user-generated content may have finished being uploaded to the backend service provider's core servers. Additionally, in instances when a backend service provider sends messages to backend service users to alert the users to new content, the backend service provider may delay sending such messages until the user-generated content may have finished uploading and may be accessible.

According to yet another embodiment, user-generated content of differing quality and size may be located at different parts of a network. The local compute node may store a full quality version of the user-generated content while the backend service provider may store a smaller, low quality version of the user-generated content. Additionally, different quality versions of the user-generated content may be dynamically moved from one location to another location based on user demand and network link bandwidth. For instance, when there may be high user demand at a network edge location, a high quality version of the user-generated content may be moved to the edge location experiencing high demand to provide a higher user experience.

According to at least one other embodiment, multiple edge compute node proxies (e.g., middleboxes) may be deployed to cover a larger area with edge proxies communicating peer-to-peer with one another. When content may be requested by a nearby location, the proxy for that location may directly request the content from the content-owning proxy instead of attempting to access the content through the bandwidth limited backhaul network. The content-owning proxy may then send the content though a higher bandwidth local network connection to the requesting proxy for access to the users linked to the requesting proxy.

Referring now to FIG. 1, an exemplary networked computer environment 100 in accordance with one embodiment is depicted. The networked computer environment 100 may include a computer 102 with a processor 104 and a data storage device 106 that is enabled to run an edge caching and time-shifting upload program 108*a*. The networked computer environment 100 may also include a server 110 that is enabled to run an edge caching and time-shifting upload program 108*b* and a communication network 112. The networked computer environment 100 may include a plurality of computers 102 and servers 110, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 110 via the communications network 112. The communications network 112 may include connections, such as wire, wireless communication links, or fiber optic cables. As will be discussed with reference to FIG. 4, server computer 110 may include internal components 800a and external components 900a, respectively and client computer 102 may include internal components 800b and external components 900b, respectively. Client computer 102 may be, for example, a mobile device, a telephone, a PDA, a netbook, a laptop computer, a tablet computer, a desktop computer, or any type of computing device capable of running a program and accessing a network.

A program, such as an edge caching and time-shifting upload program 108a and 108b may run on the client computer 102 or on the server computer 110. The edge caching and time-shifting upload program 108a and 108b may be used to provide transparent access to a cached copy of uploaded data for local users while uploading the data through bottlenecked network connections opportunistically when the bottlenecked network connection may have free bandwidth. The edge caching and time-shifting upload program 108a and 108b is explained in further detail below with respect to FIGS. 2 and 3.

Figure 2:
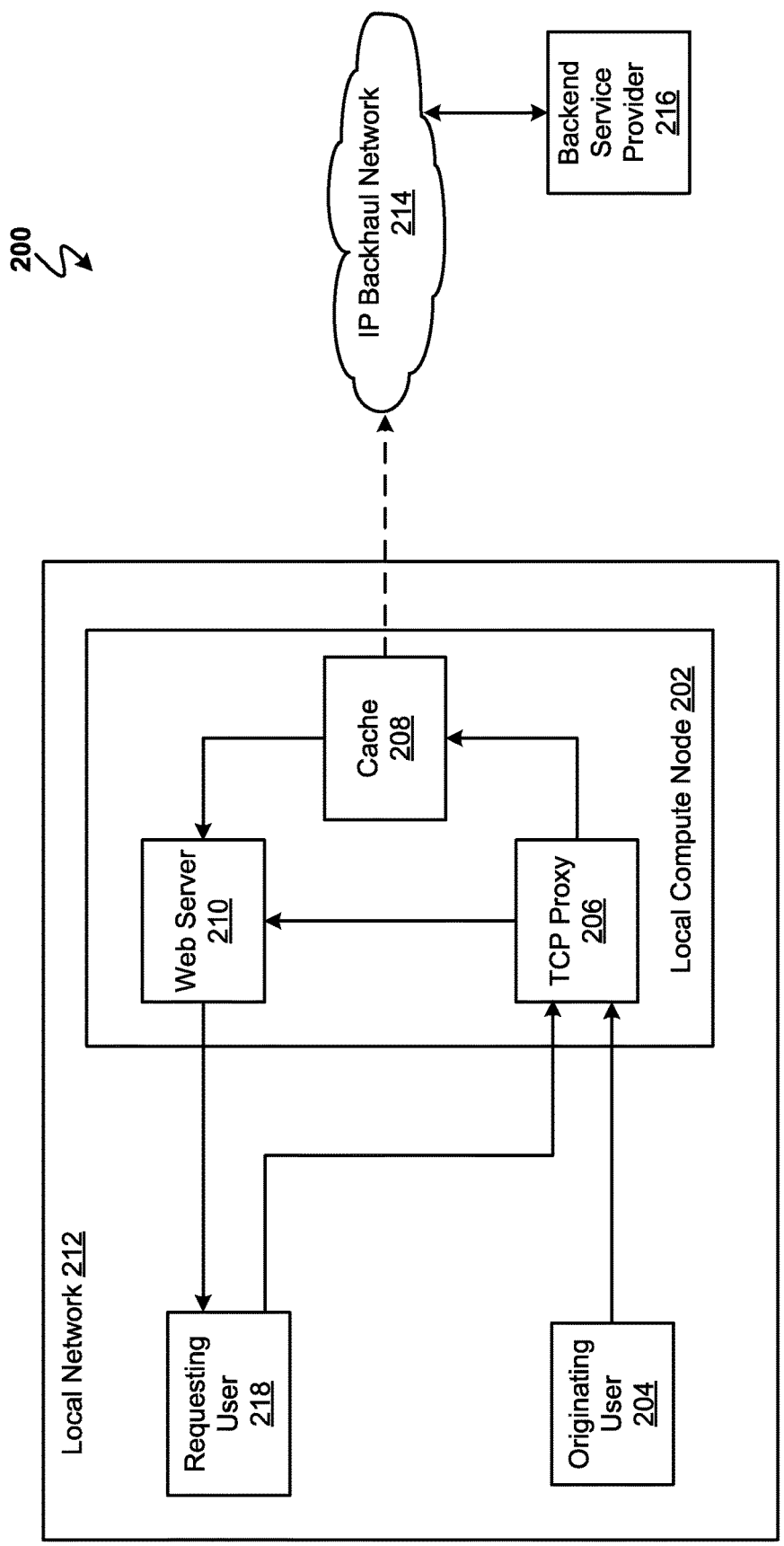
FIG. 2 is a block diagram of a middlebox at a network edge according to at least one embodiment.

FIG. 2, a block diagram of a network 200 with a local compute node 202 for caching and opportunistic uploading according to at least one embodiment is depicted. The local compute node 202 may include a transmission control protocol (TCP) proxy 206, a cache 208, and a web server 210. The local compute node 202 may be a middlebox within a local network 212 at a network edge upstream of an internet protocol (IP) backhaul network 214.

An originating user 204 attempting to upload user-generated content may send an upload request, such as an HTTP POST method (to request that a web server accept the data enclosed in the request message's body for storage), that may then be intercepted by the local compute node's 202 TCP proxy 206. The TCP proxy 206 may act as an intermediary between the originating user 204 and the IP backhaul network 214 to intercept upload and download requests. Once the TCP proxy 206 intercepts an upload request, the data file that the originating user 204 may be attempting to upload to a backend service provider 216 may be stored in the cache 208 accessible by the local compute node 202. The cache 208 may include a data storage device, such as a hard disk drive to store the data file.

Thereafter, requesting user 218 requests for the data file originating from within the local network 212 may be intercepted by the TCP proxy 206. The intercepted request from the requesting user 218 may then be served (i.e., the requesting user 218 may be sent data copied from the cached file) by the web server 210 to transparently redirect the requesting user 218 from the backend service provider 216 to the cached file stored in the cache 208. A placeholder file may then be uploaded to a backend service provider 216. Time-shifted uploading from the cache 208 to the backend service provider 216 through the IP backhaul network 214 may occur opportunistically when there may be unused bandwidth. After the data file finishes uploading to the backend service provider 216, the TCP proxy 206 may redirect requesting users 218 to the completed upload data file at the backend service provider 216.

Figure 3:
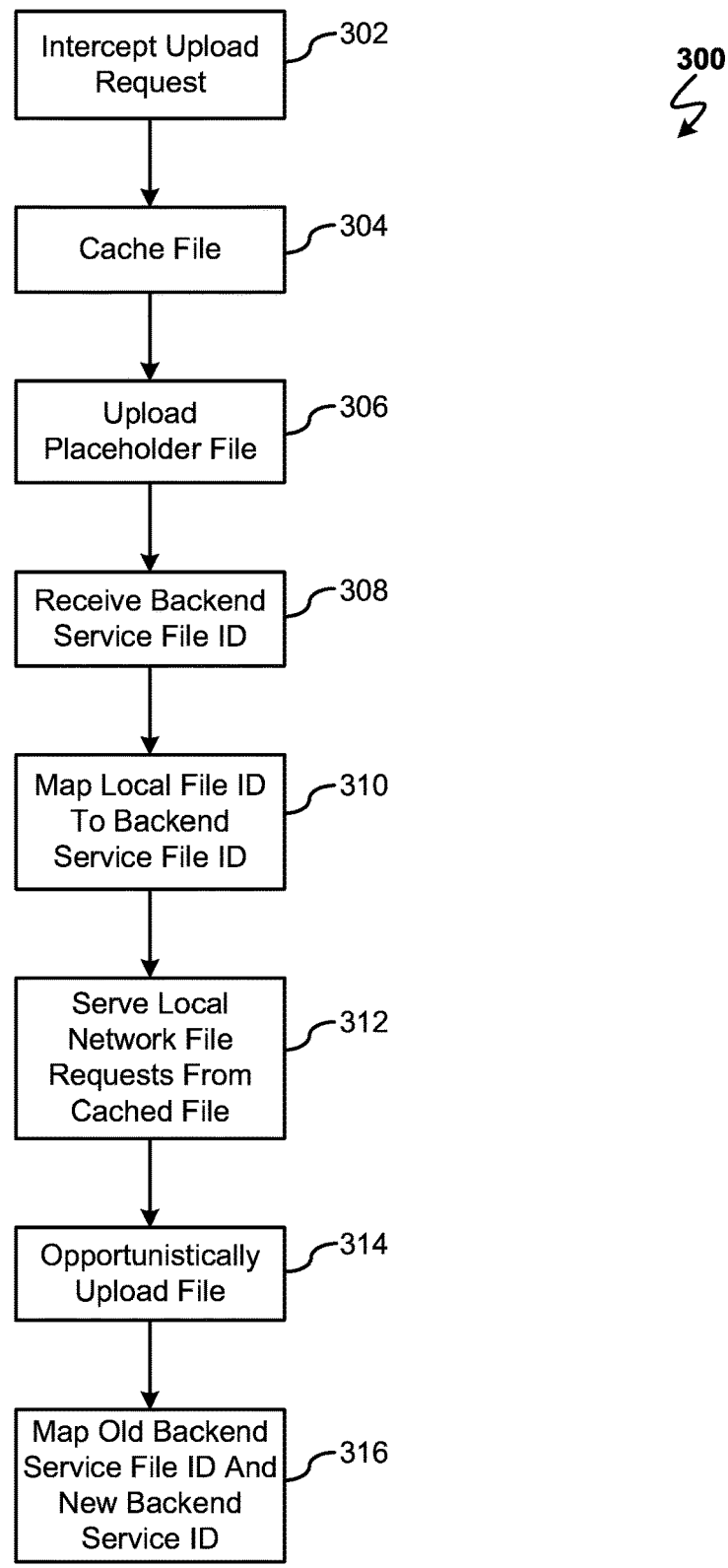
FIG. 3 is an operational flow chart illustrating a process for edge caching and time-shifted uploading according to at least one embodiment.

Referring now to FIG. 3, an operational flow chart illustrating the exemplary process 300 by the edge caching and time-shifting upload program 108a and 108b (FIG. 1) according to at least one embodiment is depicted.

At 302, an upload request from the originating user 204 (FIG. 2) may be intercepted. According to at least one embodiment, the TCP proxy 206 (FIG. 2) may intercept an upload request, such as an HTTP POST request, and the data file associated with the upload request. For example, an originating user 204 (FIG. 2) may attempt to upload a recorded video file to a backend service provider 216 (FIG. 2), such as YouTube™. The originating user's 204 (FIG. 2) web browser may generate and send an HTTP POST request to upload the video file to the backend service provider 216 (FIG. 2) that may be intercepted by the TCP proxy 206 (FIG. 2).

Next, at 304, the data file the originating user 204 (FIG. 2) uploads may be cached locally at a local compute node 202 (FIG. 2) middlebox that may be located within the local network 212 (FIG. 2) at the network edge. According to at least one embodiment, after the TCP proxy 206 (FIG. 2) intercepts an upload request, the data file associated with the upload may be copied to the cache 208 (FIG. 2). Additionally, the process 300 may assign a local file ID to the cached data file to facilitate access to the locally cached copy of the data file. For example, a video file that an originating user 204 (FIG. 2) may be uploading may be written to a data storage device, such as a hard disk drive, that may make up the cache 208 (FIG. 2). Once the video file has been written to the cache 208 (FIG. 2), the process 300 may assign a unique local file ID number to the cached video file.

Then, at 306, the process 300 may upload a placeholder file to the backend service provider 216 (FIG. 2). A small placeholder file may be uploaded in place of the original data file in order to have a complete data file sent through a limited-bandwidth network connection to have a file presence at the backend service provider 216 (FIG. 2) quickly. According to at least one embodiment, the process 300 may generate a small-sized file based on the data file the originating user 204 (FIG. 2) uploaded. For example, if the originating user 204 (FIG. 2) uploads a video file, the process 300 may create a low-resolution version of the data file to upload immediately to the backend service provider 216 (FIG. 2). It may be appreciated that other ways of generating smaller files based on the original data file may be used depending on the type of data file being uploaded (e.g., video, picture, audio, text, etc.). According to at least one other embodiment, a small generic file, that may be of the same type as the uploaded data file (e.g., video, picture, audio, text, etc.), may be uploaded as a placeholder file to the backend service provider 216 (FIG. 2).

At 308, the process 300 may receive a file ID corresponding with the uploaded placeholder file from the backend service provider 216 (FIG. 2). According to at least one embodiment, after the process 300 uploads a placeholder file to the backend service provider 216 (FIG. 2), the backend service provider 216 (FIG. 2) may send the process 300 a file ID or other reference associated with the uploaded placeholder file. For example, if the process 300 uploads a placeholder video file to YouTube™, YouTube™ may provide a uniform resource locator (URL) containing a video ID number that the process 300 may extract and use to map the uploaded placeholder file.

Next, at 310, the process 300 may map a local file ID to the file ID previously received from the backend service provider 216 (FIG. 2). According to at least one embodiment, the process 300 may map the local file ID assigned to the cached data file to the file ID received from the backend service provider 216 (FIG. 2). For example, after an originating user 204 (FIG. 2) uploads a video file, the video file may be stored in the cache 208 (FIG. 2) and assigned a unique local file ID. The process 300 may then upload a placeholder file to the backend service provider 216 (FIG. 2) and receive a file ID corresponding to the placeholder file. The local file ID may then be mapped to the received file ID from the backend service provider 216 (FIG. 2) by the process 300.

Then, at 312, the process 300 may serve requests from requesting users 218 (FIG. 2) within the local network 212 (FIG. 2) for the uploaded data file from the copy of the data file stored in the cache 208 (FIG. 2). According to at least one embodiment, after mapping the local file ID to the file ID provided by the backend service provider 216 (FIG. 2), requests for the uploaded data file from local requesting users 218 (FIG. 2) intended for the backend service provider 216 (FIG. 2) may be intercepted by the TCP proxy 206 (FIG. 2) and passed to the web server 210 (FIG. 2). The web server 210 (FIG. 2) may then transparently fulfill the request by using the full-sized local data file copy stored in the cache 208 (FIG. 2) instead of allowing the requesting user 218 (FIG. 2) to access the placeholder file previously uploaded to the backend service provider 216 (FIG. 2) by the process 300. As such, the requesting user 218 (FIG. 2) may download the local cached copy of the data file instead of accessing the placeholder file through the IP backhaul network 214 (FIG. 2) to the backend service provider 216 (FIG. 2). Thus, the requesting user 218 (FIG. 2) may download the cached copy of the data file from the cache 208 (FIG. 2) transparently, such that the requesting user 218 (FIG. 2) may not realize that the data file may have been sent from cache 208 (FIG. 2) and not the backend service provider 216 (FIG. 2).

At 314, the process 300 may opportunistically upload the full-sized copy of the data file located in the cache 208 (FIG. 2) based on a backhaul utilization policy. According to at least one embodiment, the backhaul utilization policy may instruct background uploading to begin immediately. According to at least one other embodiment, the backhaul utilization policy may instruct background uploading to occur when the bandwidth in the IP backhaul network 214 (FIG. 2) may not be fully utilized. According to yet another embodiment, the backhaul utilization policy may instruct background uploading to occur based on a dynamic request from the originating user 204 (FIG. 2) to set the priority of the upload (e.g., urgent uploads having priority over normal uploads). According to at least one other embodiment, the backhaul utilization policy may instruct background uploading to occur based on customer experience management (CEM) rules or based on contracts (e.g., high-profile user having priority for uploads over regular users).

According to yet another embodiment, the backhaul utilization policy may instruct background uploading to occur in multiple batches when bandwidth in the IP backhaul network 214 (FIG. 2) may not be fully utilized. For example, the process 300 may initially create a low quality copy of a video file to upload in a first batch upload as free bandwidth allows. In the next batch upload, the process 300 may send an overlay with additional data based on the original full quality video file to create a higher quality video file when combined with the previously uploaded low quality video file. Subsequent batch uploads may occur iteratively, with new overlays that may be combined with previously uploaded overlays and the originally uploaded low quality video file to create progressively higher quality versions of the uploaded video file. Once enough overlays have been successively sent in batch uploads, the combined overlays and originally uploaded low quality video file may be equivalent to (i.e., matches) the original full quality video file. It may be appreciated that progressively uploading partial data as an overlay to create higher quality files through combining a low quality file version with multiple overlays may be applied to other types of data files (e.g., audio, pictures, text, etc.).

Next, at 316, after uploading the data file to the backend service provider 216 (FIG. 2), the process 300 may map the old file ID associated with the placeholder file to the new file ID of the full-sized file upload accessible at the backend service provider 216 (FIG. 2). According to at least one embodiment, in instances when the backend service provider 216 (FIG. 2) may not allow the full-sized file upload to overwrite the previously uploaded placeholder file, the process 300 may upload the full-sized file as a new upload that may have a new file ID. The process 300 may then receive the new file ID from the backend service provider 216 (FIG. 2) and map the file ID associated with the placeholder file to the file ID associated with the full-size file. As such, a requesting user 218 (FIG. 2) that requests access to the placeholder file may be transparently redirected (e.g., by the TCP proxy 206 (FIG. 2)) to the full-sized file. In instances when the backend service provider 216 (FIG. 2) allows the placeholder file to be overwritten, mapping may not be needed as there may not be a new file ID for the full-sized file.

It may be appreciated that FIGS. 2 and 3 provide only an illustration of one implementation and do not imply any limitations with regard to how different embodiments may be implemented. Many modifications to the depicted embodiment may be made based on design and implementation requirements, such as the alternative embodiments described previously.

Figure 4:
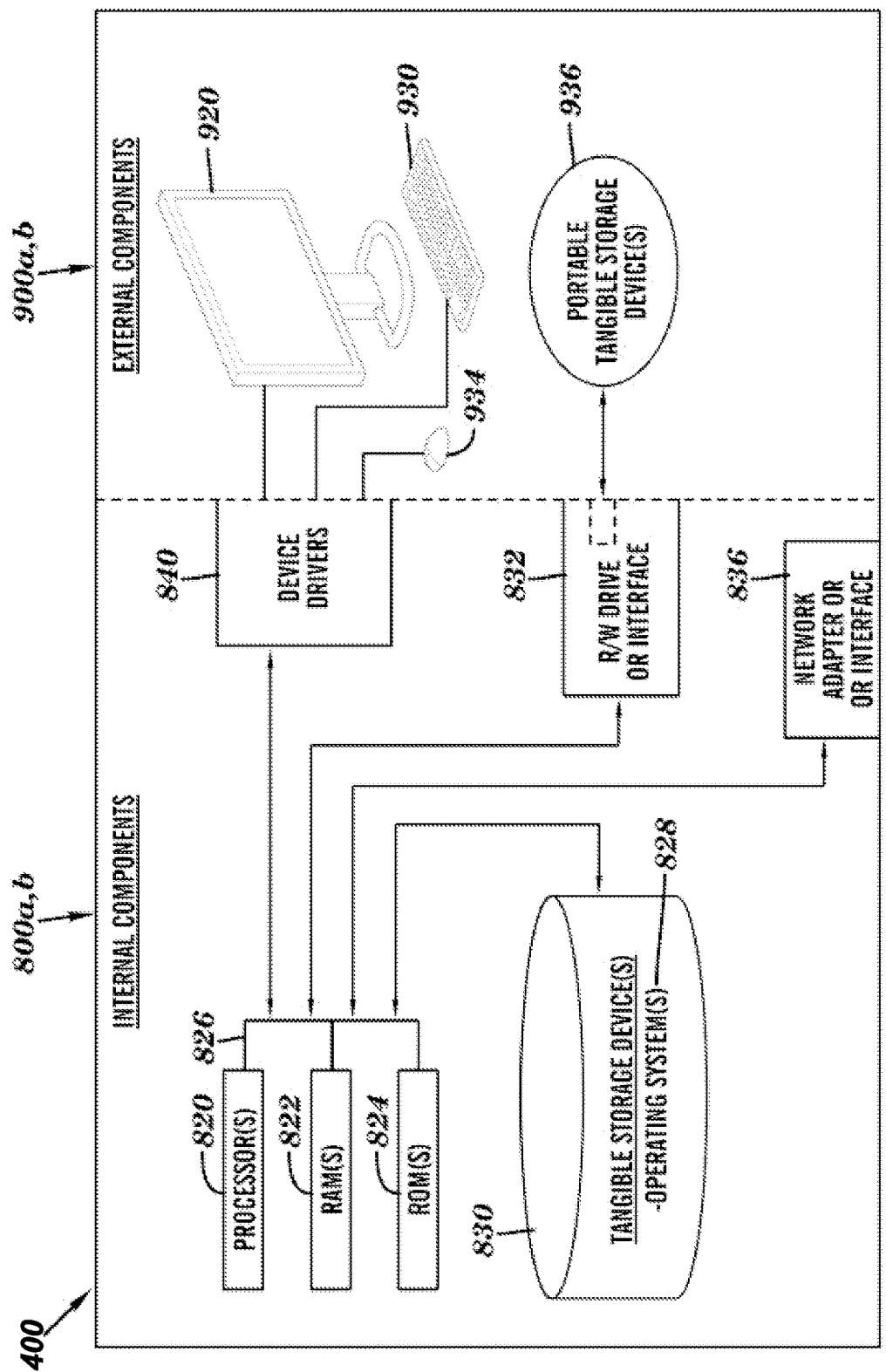
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 110 (FIG. 1) may include respective sets of internal components 800*a, b* and external components 900*a, b* illustrated in FIG. 4. Each of the sets of internal components 800*a, b* includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs such as an edge caching and time-shifting upload program 108*a* and 108*b* (FIG. 1), may be stored on one or more computer-readable tangible storage devices 830 for execution by one or more processors 820 via one or more RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800*a, b* also includes a R/W drive or interface 832 to read from and write to one or more portable computer-readable tangible storage devices 936 such as a CD-ROM, DVD, memory stick, magnetic tape, magnetic disk, optical disk or semiconductor storage device. The edge caching and time-shifting upload program 108*a* and 108*b* (FIG. 1) can be stored on one or more of the respective portable computer-readable tangible storage devices 936, read via the respective R/W drive or interface 832 and loaded into the respective hard drive 830.

Each set of internal components 800*a, b* may also include network adapters (or switch port cards) or interfaces 836 such as a TCP/IP adapter cards, wireless wi-fi interface cards, or 3G or 4G wireless interface cards or other wired or wireless communication links. The edge caching and time-shifting upload program 108*a* (FIG. 1) in client computer 102 (FIG. 1) and the edge caching and time-shifting upload program 108*b* (FIG. 1) in network server computer 110 (FIG. 1) can be downloaded from an external computer (e.g., server) via a network (for example, the Internet, a local area network or other, wide area network) and respective network adapters or interfaces 836. From the network adapters (or switch port adaptors) or interfaces 836, the edge caching and time-shifting upload program 108*a* (FIG. 1) in client computer 102 (FIG. 1) and the edge caching and time-shifting upload program 108*b* (FIG. 1) in network server computer 110 (FIG. 1) are loaded into the respective hard drive 830. The network may comprise copper wires, optical fibers, wireless transmission, routers, firewalls, switches, gateway computers and/or edge servers.

Each of the sets of external components 900*a, b* can include a computer display monitor 920, a keyboard 930, and a computer mouse 934. External components 900*a, b* can also include touch screens, virtual keyboards, touch pads, pointing devices, and other human interface devices. Each of the sets of internal components 800*a, b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for time-shifted uploading of a data file through a backhaul network to a backend provider, the method comprising:

intercepting an upload request to the backend provider, wherein the intercepted upload request is associated with the data file from an originating user located at a network edge within a local network, and wherein the backhaul network connects the local network to the backend provider;

caching the data file associated with the upload request in the local network upstream of the backhaul network, wherein caching the data file associated with the upload request comprises storing a cached copy of the data file on a storage device located at the network edge of the local network;

uploading a placeholder file to the backend provider based on the intercepted upload request;

receiving a file identifier (ID) from the backend provider based on the uploaded placeholder file;

mapping the received file ID to the cached data file;

intercepting a request to access the data file at the backend provider by a requesting user located within the local network;

sending the requesting user the cached data file within the local network based on the mapping and the intercepted access request; and uploading a copy of the data file to the backend provider through the backhaul network based on a backhaul utilization policy, wherein the backhaul utilization policy instructs the uploading to occur based on customer experience management rules, wherein uploading the copy of the data file to the backend provider comprises uploading a low quality version of the data file and then iteratively uploading a plurality of data overlays derived from a full quality version of the data file to increase a data quality of the copy stored at the backend service provider with each successive data overlay until the data quality of the copy stored at the backend service provider matches the full quality version of the data file, and wherein a data overlay is combined with the copy of the data file to generate a progressively higher quality data file stored at the backend service provider.

2. The method of claim 1, wherein the backhaul utilization policy comprises a policy based on at least one of uploading when a bandwidth associated with the backhaul network is not fully utilized, upload user priority, or dynamic user request.

3. The method of claim 1, wherein the placeholder file comprises a small file generated based on the data file.

4. The method of claim 1, where the uploading the copy of the data file to the backend provider comprises overwriting the placeholder file at the backend service provider.

5. The method of claim 1, further comprising:

receiving a new file ID from the backend service provider; and mapping the new file ID to the file ID.

6. A computer system for time-shifted uploading of a data file through a backhaul network to a backend provider, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

intercepting an upload request to the backend provider, wherein the intercepted upload request is associated with the data file from an originating user located at a network edge within a local network, and wherein the backhaul network connects the local network to the backend provider;

caching the data file associated with the upload request in the local network upstream of the backhaul network, wherein caching the data file associated with the upload request comprises storing a cached copy of the data file on a storage device located at the network edge of the local network;

uploading a placeholder file to the backend provider based on the intercepted upload request;

receiving a file identifier (ID) from the backend provider based on the uploaded placeholder file;

mapping the received file ID to the cached data file;

intercepting a request to access the data file at the backend provider by a requesting user located within the local network;

sending the requesting user the cached data file within the local network based on the mapping and the intercepted access request; and uploading a copy of the data file to the backend provider through the backhaul network based on a backhaul utilization policy, wherein the backhaul utilization policy instructs the uploading to occur based on customer experience management rules, wherein uploading the copy of the data file to the backend provider comprises uploading a low quality version of the data file and then iteratively uploading a plurality of data overlays derived from a full quality version of the data file to increase a data quality of the copy stored at the backend service provider with each successive data overlay until the data quality of the copy stored at the backend service provider matches the full quality version of the data file, and wherein a data overlay is combined with the copy of the data file to generate a progressively higher quality data file stored at the backend service provider.

7. The computer system of claim 6, wherein the backhaul utilization policy comprises a policy based on at least one of uploading when a bandwidth associated with the backhaul network is not fully utilized, upload user priority, or dynamic user request.

8. The computer system of claim 6, wherein the placeholder file comprises a small file generated based on the data file.

9. The computer system of claim 6, where the uploading the copy of the data file to the backend provider comprises overwriting the placeholder file at the backend service provider.

10. The computer system of claim 6, further comprising:
receiving a new file ID from the backend service provider; and
mapping the new file ID to the file ID.

11. A computer program product for time-shifted uploading of a data file through a backhaul network to a backend provider, comprising:

one or more computer-readable storage medium and program instructions stored on at least one of the one or more tangible storage medium, the program instructions executable by a processor, the program instructions comprising:

intercepting an upload request to the backend provider, wherein the intercepted upload request is associated with the data file from an originating user located at a network edge within a local network, and wherein the backhaul network connects the local network to the backend provider;

caching the data file associated with the upload request in the local network upstream of the backhaul network, wherein caching the data file associated with the upload request comprises storing a cached copy of the data file on a storage device located at the network edge of the local network;

uploading a placeholder file to the backend provider based on the intercepted upload request;

receiving a file identifier (ID) from the backend provider based on the uploaded placeholder file;

mapping the received file ID to the cached data file;

intercepting a request to access the data file at the backend provider by a requesting user located within the local network;

sending the requesting user the cached data file within the local network based on the mapping and the intercepted access request; and uploading a copy of the data file to the backend provider through the backhaul network based on a backhaul utilization policy, wherein the backhaul utilization policy instructs the uploading to occur based on customer experience management rules, wherein uploading the copy of the data file to the backend provider comprises uploading a low quality version of the data file and then iteratively uploading a plurality of data overlays derived from a full quality version of the data file to increase a data quality of the copy stored at the backend service provider with each successive data overlay until the data quality of the copy stored at the backend service provider matches the full quality version of the data file, and wherein a data overlay is combined with the copy of the data file to generate a progressively higher quality data file stored at the backend service provider.

12. The computer program product of claim 11, wherein the backhaul utilization policy comprises a policy based on at least one of uploading when a bandwidth associated with the backhaul network is not fully utilized, upload user priority, or dynamic user request.

13. The computer program product of claim 11, wherein the placeholder file comprises a small file generated based on the data file.

14. The computer program product of claim 11, wherein the uploading the copy of the data file to the backend provider comprises overwriting the placeholder file at the backend service provider.

* * * * *